UNITED STATES PATENT OFFICE.

JOHN GUNNING, OF NEW YORK, N. Y., ASSIGNOR OF ONE-HALF TO A. M. INGERSOLL, OF SAME PLACE.

LETTER AND FIGURE.

SPECIFICATION forming part of Letters Patent No. 265,061, dated September 26, 1882.

Application filed August 19, 1882. (No specimens.)

*To all whom it may concern:*

Be it known that I, JOHN GUNNING, of the city and State of New York, have invented a new and useful Improvement in Enameled Metallic Letters and Figures, of which the following is a clear, full, and exact description.

My improvement relates to that class of letters and figures used for signs and windows; and it consists in forming the letters of enamel baked on plates of copper or other suitable metal.

To enable others skilled in the art to make and use my invention, I will proceed to describe the exact manner in which I have carried it out.

My improved letters and figures are made of white enamel baked on copper or other suitable metal, and are much more durable and attractive than glass letters, and can be seen almost as well at night as in the day. They can be removed at any time without injury and attached to other windows without having to be refinished. They can be attached to glass, wood, stone, or any other smooth surface.

By attaching a metal eye on each side of the letters they can be nailed or screwed on and removed at pleasure.

The letter or figure is first stamped from the metal and then the enamel is baked on in the usual way.

These letters thus made present a neat, clean, and attractive article in the way of signs for show-windows and doors, and may be colored to suit any taste.

Having thus explained my invention, what I claim as new, and desire to secure by Letters Patent, is—

As an improved article of manufacture, letters and figures made of enamel baked on copper or other metal plates, substantially as and for the purpose herein described.

JOHN GUNNING.

Witnesses:
JOHN P. SCHMITT,
CHARLES W. MACK.